(12) United States Patent
Vasylyev

(10) Patent No.: US 11,706,858 B2
(45) Date of Patent: *Jul. 18, 2023

(54) OCCUPANCY SENSING LIGHTING CONTROL SYSTEM

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC, Sacramento, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/402,471

(22) Filed: Aug. 13, 2021

(65) Prior Publication Data

US 2021/0378074 A1 Dec. 2, 2021

Related U.S. Application Data

(63) Continuation of application No. 16/706,788, filed on Dec. 8, 2019, now Pat. No. 11,092,938, which is a continuation of application No. 15/606,852, filed on May 26, 2017, now Pat. No. 10,534,334, which is a continuation of application No. 14/556,212, filed on Nov. 30, 2014, now Pat. No. 9,696,701.

(60) Provisional application No. 61/913,285, filed on Dec. 7, 2013.

(51) Int. Cl.
*H05B 47/115* (2020.01)
*G05B 15/02* (2006.01)
*H05B 47/105* (2020.01)

(52) U.S. Cl.
CPC ........... *H05B 47/115* (2020.01); *G05B 15/02* (2013.01); *H05B 47/105* (2020.01)

(58) Field of Classification Search
CPC ..... G05B 15/02; H05B 47/105; H05B 47/115
See application file for complete search history.

(56) References Cited

U.S. PATENT DOCUMENTS

| | | |
|---|---|---|
| 6,211,783 B1 | 4/2001 | Wang |
| 6,490,455 B1 | 12/2002 | Park et al. |
| 6,765,492 B2 | 7/2004 | Harris |

(Continued)

FOREIGN PATENT DOCUMENTS

| | | | | |
|---|---|---|---|---|
| CN | 101652732 A | * | 2/2010 | .......... F24F 11/0012 |
| CN | 201830434 U | * | 5/2011 | ............... H04R 3/00 |

(Continued)

*Primary Examiner* — Ronald D Hartman, Jr.

(57) ABSTRACT

An occupancy sensing lighting control system is disclosed. The occupancy sensing lighting control system includes an electric lighting fixture configured to illuminate a surrounding area, a wireless communication unit associated with the electric lighting fixture, a signal-generating device, a signal detector, an occupancy condition generating device, and a load control device configured to control the current supplied to the electric lighting fixture. The signal-generating device generates control signals detectable by a mobile cellular phone device which is located within the surrounding area and is not being in an active call mode. The signal detector detects communication signals generated by the mobile cellular phone device and the occupancy condition generating device determines occupancy condition in response to a detection of communication signals from the mobile cellular phone device.

20 Claims, 4 Drawing Sheets

(56) References Cited

U.S. PATENT DOCUMENTS

| | | |
|---|---|---|
| 7,474,264 B2 | 1/2009 | Bolduc et al. |
| 7,924,155 B2 | 4/2011 | Soccoli et al. |
| 8,009,042 B2 | 8/2011 | Steiner et al. |
| 8,018,166 B2 | 9/2011 | Soccoli et al. |
| 8,412,382 B2 | 4/2013 | Imes et al. |
| 8,482,425 B2 | 7/2013 | Lauer et al. |
| 8,655,277 B2 | 2/2014 | Jesudason et al. |
| 2009/0184823 A1 | 1/2009 | Tessier |
| 2009/0065596 A1 | 3/2009 | Seem et al. |
| 2010/0052574 A1 | 3/2010 | Blakeley et al. |
| 2010/0171430 A1 | 7/2010 | Seydoux |
| 2010/0204834 A1 | 8/2010 | Comerford et al. |
| 2010/0225540 A1 | 9/2010 | Koizumi et al. |
| 2011/0160881 A1 | 6/2011 | Grey |
| 2012/0019168 A1 | 1/2012 | Noda et al. |
| 2012/0154115 A1 * | 6/2012 | Herrala .................... G07C 9/28 340/5.64 |
| 2013/0048436 A1 | 2/2013 | Chan |
| 2014/0129041 A1 | 5/2014 | Williams |
| 2014/0177469 A1 | 6/2014 | Neyhart |
| 2014/0222210 A1 | 8/2014 | Agarwal |
| 2014/0266669 A1 | 9/2014 | Fadell et al. |
| 2015/0005900 A1 | 1/2015 | Steele et al. |

FOREIGN PATENT DOCUMENTS

| | | | | |
|---|---|---|---|---|
| CN | 102122403 A | * | 7/2011 | ............... G07C 9/00 |
| JP | 07312776 A | * | 11/1995 | ............... H04Q 7/34 |
| JP | 4146612 B2 | * | 9/2008 | ............... H04Q 7/38 |

* cited by examiner

OCCUPANCY SENSING LIGHTING CONTROL SYSTEM

CROSS-REFERENCE TO RELATED APPLICATIONS

This application is a continuation of U.S. application Ser. No. 16/706,788, filed Dec. 8, 2019, which is a continuation of U.S. application Ser. No. 15/606,852, filed May 26, 2017, which is a continuation of U.S. application Ser. No. 14/556,212, filed Nov. 30, 2014. This application also claims priority from U.S. provisional application Ser. No. 61/913,285 filed on Dec. 7, 2013, the disclosure of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to electric load control systems employing occupancy or vacancy sensors for detecting an occupancy or a vacancy in a space, and more particularly, to a load control system including a radio frequency detector for detecting an occupancy or a vacancy in a space and a load control device for controlling the amount of power delivered to an electrical load in response to the detection of occupancy or vacancy.

2. Description of Background Art

Energy efficiency measures in buildings often utilize automated control systems that detect occupancy and/or vacancy conditions in a space and use such information to control electrical load devices, such as, for example, lighting fixtures, heating units, air conditioning units, ventilation units, or security systems.

Conventionally, load control systems employ occupancy sensors that detect motion within a space in order to determine the occupancy or vacancy condition. Some of the most common motion detection sensors include passive infrared ("PIR") sensors, ultrasonic sensors and a combination of the two.

Such types of occupancy sensors, however, can only detect moving objects and usually require a direct line of sight between the sensor and the object. In the absence of occupant movements, the occupancy may remain undetected thus resulting in false triggering of the vacancy condition. Various objects within the space, room partitions or unusual room configurations can partially block the view of sensors and also cause false triggering. Improper sensor installation or changes in the room interior may also be a source of erroneous operation of the load control. When conventional occupancy sensors are used to switch lights on and off in a room, false triggering, inadequate sensor spacing, or view-blocking objects may cause a commonly observed condition when occupants are left in the dark.

The failures of occupancy sensors to detect vacancy condition often cause occupants' complaints, create work inefficiencies and may jeopardize occupant safety. All this slows the adoption of energy saving measures which rely on electric load control based on space occupancy.

It is therefore an object of this invention to provide an improved load control system which does not require the direct line of sight or object motion for occupancy or vacancy detection. It is another object of this invention to provide an independent method of detecting occupancy and/or vacancy in a space which can be used for improving the detection rate. The occupancy sensing load control system of this invention can be used in a stand-alone operation or can be integrated with other types of occupancy/vacancy sensing devices. Other objects and advantages of this invention will be apparent to those skilled in the art from the following disclosure.

BRIEF SUMMARY OF THE INVENTION

Accordingly, the present invention is directed to radio frequency occupancy sensing load control systems which may be employed to control electric load within a certain area. More particularly, this invention is directed to a system for detecting the presence or absence of a mobile radio frequency communication device in such area.

According to one aspect of the invention, the occupancy sensing load control system uses radio frequency (RF) signals emitted by electrically powered mobile radio-emitting devices such as hand held cell phones or similar personal wearable communication devices which are energized by an internal or external battery and which can be reasonably associated with people who carry such devices with them in and out from a space.

According to one aspect of the invention, the occupancy sensing load control system can be made responsive to radio frequency (RF) signals emitted by mobile communication devices associated with vehicles such as cell phones, radios or global positioning systems used for mobile fleet communication.

In at least one embodiment, the invention features an occupancy detector load control system comprising a radio-frequency detector configured to detect the presence or absence of a personal radio-emitting communication device within a predetermined distance from the sensor and a load control device connected between an electrical power source and an electrical load. The control device is configured to receive signals from the detector and control the current supplied to the electrical load in a predetermined dependence on the detection of the presence or absence of the radio-emitting device.

The load control system may be amenable to include the detection of a broad range of mobile communication devices, including mobile phones, cellular phones, satellite phones, smart phones, pagers, personal digital assistants (PDA), tablet computers, mobile personal computers, wireless medical devices, wireless network devices, personal area network devices, wireless headsets, portable radios, cordless telephones, and global positioning systems (GPS).

In various implementation of the detector, it may be configured for occupancy/vacancy detection within a predefined area and may further include means for adjusting the detection range. According to a further implementation, the operational radio frequencies of the detector can include the range from 50 MHz to 6 GHz. According to a yet further implementation, the operational radio frequencies of the detector can include at least one of the following ranges: 824-849 MHz and 1850-1910 MHz.

In at least some embodiments, the load control system may be configured to produce various predefined control signals. The system may particularly comprise a signal-generating unit for generating a radio signal that can trigger a response signal from the radio-emitting device. The system may also be configured to produce an audible or visual alarm.

According to one embodiment, the load control system may be configured to control the amount of power delivered from an electrical power source to an electrical load provided in a space and may comprise: a signal-generating unit for generating a pseudo base station signal based on zone information of neighboring base stations for transmission to a mobile phone in a detection area; a detecting unit adapted to detect a response signal that a mobile phone transmits in response to the pseudo base station signal; and a control unit that controls the operation of the load in response to the detection of the response signal by the detecting unit.

In at least one embodiment, a method of controlling the amount of power delivered from an electrical power source to an electrical load within a space is provided. Such method may comprising the steps of providing a radio-frequency sensor in such space; detecting a vacancy condition by the sensor in response to the absence of one or more predetermined radio-frequency signals during a predetermined period of time; generating a vacant control signal by the sensor in response to the step of detecting the vacancy condition; and ceasing the delivery of power to the electrical load in response to the step of generating the vacant control signal from the sensor.

In at least one embodiment, the method of controlling the amount of power delivered from an electrical power source to an electrical load may comprise the steps of (a) transmitting a pseudo base station signal within a detection area, using zone information of neighboring base stations to generate said pseudo base station signal; b) detecting a vacancy condition in the detection area in response to the absence of a predetermined response signal to the pseudo base station signal; and (c) ceasing the delivery of power to the electrical load in response to the step of detecting the vacancy condition in the detection area.

In at least one embodiment, the load control system may be combined with other types of occupancy or vacancy detectors. In various implementations, the system includes a motion detector, a PIR occupancy sensor, an ultrasonic occupancy sensor, or any combination thereof.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in the preceding figures. It will be appreciated that the apparatus may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

The present invention seeks to provide occupancy sensing load control systems that can detect the occupancy or vacancy conditions independently or in addition to prior-art occupancy detection systems based on motion detectors.

According to the present invention, there is provided an occupancy sensing load control system that uses radio frequency (RF) signals emitted by electrically powered, mobile radio-emitting devices such as wireless phones, satellite phones, smart phones, pagers, personal digital assistants (PDA), tablet computers, wearable personal computers, wireless medical devices, wireless network devices, wireless modems, personal area network devices, wireless cameras, wireless headsets, portable radios, cordless telephones, and global positioning systems (GPS). The invention is particularly directed to detecting personal hand-held communication devices which are energized by an internal or external battery and which can be reasonably associated with people who carry such devices with them in and out from a space. The invention is also primarily directed to detecting mobile communication devices that people use in their day-to-day life (e.g., cell phones) and that are normally not associated with occupancy control systems.

It is noted however, that the present invention is not limited to detecting only the personal wearable devices and may be amenable to include the detection of mobile communication devices associated with vehicles, such as for example, cell phones, radios and GPS used in mobile fleet communication.

The occupancy sensing load control system comprises an RF signal detection unit which detects the presence of an RF emitting device in a space and uses such information to identify the occupancy or vacancy condition and, consequently, to control an electric load in response to the occupancy or vacancy condition.

Figure 1:
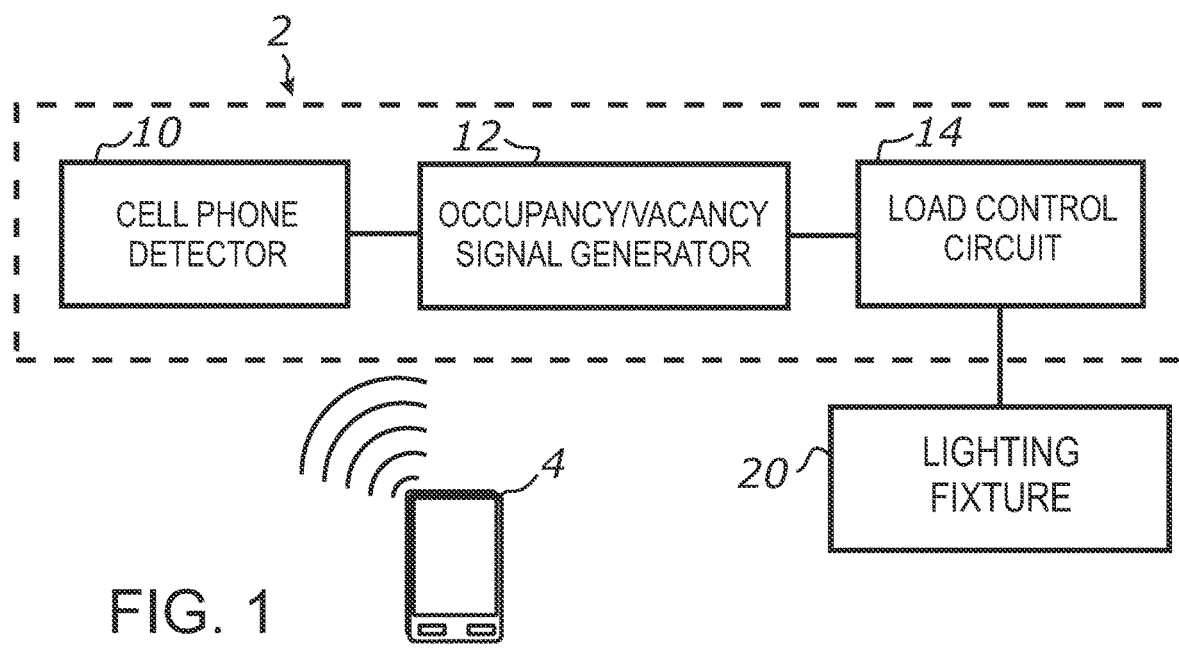
FIG. 1 is a schematic view of an occupancy sensing load control system using a mobile phone detector, according to at least one embodiment of the present invention.

Referring to FIG. 1, an embodiment of the occupancy sensing load control system 2 includes a cell phone detector 10, an occupancy/vacancy signal generator 12, and a load control circuit 14 which is connected to a lighting fixture 20 in a room of a building. Cell phone detector 10 is configured to detect the presence of personal RF devices in the room, such RF devices being exemplified by a cell phone 4 in FIG. 1.

It is preferred that detector 10 is designed to detect the presence of phone 4 within a predetermined distance from the detector and is used to monitor at least one and/or several of the "transmit" frequency bands utilized by handheld cellular phones. Particularly, detector 10 should be responsive to a radio frequency signal in the range of at least one transmit frequency band from the operation of phone 4, (e.g., 824-849 MHz and 1850-1910 MHz). By way of example and not limitation, detector 10 may be configured to detect cell phones transmitting RF energy using one or more of the following wireless communication protocols: 2G, 3G, 4G, 4G LTE, GSM, GPRS, CDMA, FDMA, TDMA, IDEN, WCDMA, Wifi, WiMAX, and Bluetooth.

Detector 10 is not required to monitor or record the phone conversation or determine the identity of the person who may be using the cellular phone and should not normally raise the privacy concerns. Moreover, detector 10 is also not required to detect the usage of phone 4 by its owner/operator. Its primary function is detecting the mere presence of phone 4 in a proximity from the detector. It will be appreciated by those skilled in the art that detector 10 functioning in a "listening" mode will not cause any interference with normal cellular phone service or other wireless devices in the monitored area. It will further be appreciated that such passive operation of system 2 will not violate laws that prohibit monitoring of cellular phone conversations.

It is noted that detector 10 is generally intended to detect a cellular phone signal only within a limited distance from the position of the detector and reject, ignore or be insensitive to signals originating from greater distances. This may be accomplished, for example, by configuring the detection circuit to detect RF signals only if the strength of such signal is greater than a predetermined threshold. In one embodiment, such threshold can be made tunable to result in different detection distances from the detector 10 to the cell phone 4. Moreover, individual thresholds may be set for different frequencies or different types of the RF signal. This may be particularly useful considering that RF power levels of the transmitted signal may differ, for example, across different types of wireless networks or communication protocols.

Cell phone detector 10 may be configured to be responsive to at least one, more than one, or all of the following operations of cell phone 4 resulting in RF transmission: initiating a call, receiving a call, conversation over the cellular network, data transfer, sending and/or receiving text messages, and registering on the cellular network.

It should be understood that the operation of cell phone detector 10 is not limited to detecting only the RF signal resulting from the user operation of phone 4 and may be configured to detect short RF transmissions of information that phone 4 may be automatically sending to the cellular network. Such transmissions may be periodic or may occur at varied intervals and may include, for example, phone registration with the cellular tower or station, requests for voicemail messages, text messages, or email that may waiting in queue, and the like. For many cell phones, such transmissions typically occur at intervals between a few minutes and up to 20-30 minutes. Accordingly, as long as phone 4 remains powered up, automatic RF transmissions may reveal the presence of such phone in a space and may thus be useful for detecting the occupancy even if phone 4 is in the standby or idle mode.

There are a variety of commercially available cell phone detectors that can be utilized by those skilled in the art to practice the present invention. One example is Model CSD-710 cell phone detector sold by Enterprise Electronics (http://www.eeontheweb.com). Other examples include PocketHound and Wolfhound cell phone detectors from Berkeley Varitronics Systems. At least some of such detectors are claimed to detect cell phones during both active phone calls and inactive (standby) modes.

Various types of cell phone detectors that communicate with other electronic devices have also been described in the prior art. For example, U.S. Pat. No. 8,482,425 describes a cell phone detector for washing machines. Such detector is attached to the washing machine in a location that receives RF signals emanated from the interior of the washing machine. There is also provided a warning device that receives a signal from the detector to generate an alert when the detector has detected a RF signal from the interior of the washing machine, wherein the radio frequency signals have a frequency in a band designated for mobile phone signals.

In certain applications, it may be necessary to suppress false detections of phones which are outside of the certain area surrounding detector 10. False detections can be reduced by deploying one or more additional RF antennas of the detector within the area and comparing the signals received by such antennas.

Additionally, detector 10 or one or more of its RF-sensing antennas can be provided with RF-shielding covers which can block signals arriving from unwanted directions. Each of such covers should be conductive and may conventionally be made from metal sheet or mesh or various types of RF absorbing materials. The RF shielding cover may also be cone-shaped in order to provide improved detection in a selected direction. Various other types of direction-limiting devices may be used to enable detector 10 to monitor only the designated space and ignore signals originating outside of such space, hereby limiting false triggering.

Referring further to FIG. 1, occupancy/vacancy signal generator 12 is configured to receive signals from detector 10 and determine the occupancy or vacancy condition or status. By way of example and not limitation, the occupancy condition may be identified by receiving any indication of qualified RF transmission originating from within the area being monitored, while the vacancy condition may be identified by the absence of such transmission within a predetermined timeout interval.

Load control circuit 14 is connected between an electrical power source and the respective electrical load such as lighting fixture 20. Load control circuit 14 is further configured to receive signals from occupancy/vacancy signal generator 12 and control the current supplied to the electrical load. According to one embodiment, load control circuit 14 is configured to turn light off in response to the vacancy detection thus saving electric energy used for lighting.

According to one embodiment, load control 14 may further be configured to turn lights on in response to the occupancy detection. Such operation may be enabled by occupancy/vacancy signal generator 12 sending the respective occupancy or vacancy signals to load control circuit 14 and said load control circuit respectively turning on or off the electric load for lighting fixture 20.

A novel principle behind the detection of the occupancy and/or vacancy in a space is based on the facts that cell phones and other RF-emitting hand-held devices have become very widespread and that such devices transmit RF signals when in use and even in the idle mode. According to the survey conducted by Pew Research Center's Internet & American Life Project, cell phone ownership among adults was 91% in 2012 and that the ownership percentage has been steadily increasing since 2004. An electronic copy of the report can be found at this internet link: http://pewinternet.org/~/media//Files/Reports/2012/PIP_Best_Worst_Mobile_113012.pdf). The assessment of the commercial office environment indicates that cell phone ownership in a typical office is generally even greater, often being 100%, which provides a convenient opportunity to determine the occupancy and/or vacancy conditions within office space without relying solely on motion sensors.

The occupancy/vacancy signal generator 12 and load control circuit 14 may be combined into an integral load control device which provides the combined functions of occupancy and/or vacancy determination and control signal generation for lighting fixture 20. Alternatively, cell phone detector 10 may be combined with occupancy/vacancy signal generator 12 into a single unit which provides cell phone detection and occupancy/vacancy signal generation functions.

Figure 2:
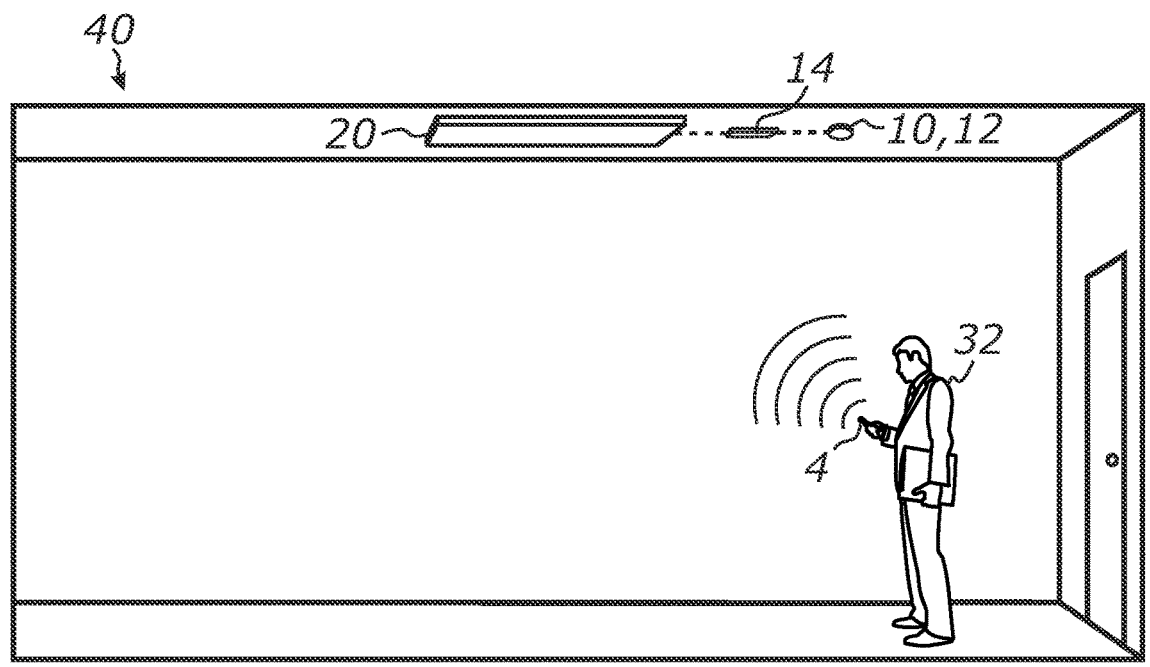
FIG. 2 is a schematic view of a ceiling mounted lighting control system using a mobile phone detector, according to at least one embodiment of the present invention.

FIG. 2 schematically shows a portion of an office room 40 where elements 10, 12 and 14 of system 2 are mounted on the ceiling in a vicinity of lighting fixture 20. When a room occupant 32 enters room 40 and operates his hand-held cell phone 4, said cell phone emits RF signal which is detected by detector 10. In response to such detection, signal generator 12 generates an occupancy signal and commands load control circuit 14 to turn on lighting fixture 20. When occupant 32 leaves room 40, signal generator 12 generates a vacancy signal after a predetermined timeout period and commands load control circuit 14 to turn off lighting fixture 20.

Detector 10 may be configured to detect cell phones only in a proximity of lighting fixture 20 so that room occupants present in other areas of the room or outside of the room will not unnecessarily trigger lights on or prevent detection of vacancy condition if there are no occupants near fixture 20.

Detector 10 may be positioned in a close proximity to lighting fixture 20 or even incorporated into the lighting fixture. Since RF signals propagate through the walls and other obstacles, detector 10 and other components of system 2 may be hidden from the occupants' view and positioned above the ceiling, behind walls or in an enclosed space. By adjusting the sensitivity of detector 10, the detection range can be set to include relatively large areas. Accordingly, fewer detectors may be needed to monitor a given area compared to the case when motion detectors are used. In one embodiment, cell phone detector 10 may be configured to detect mobile phones in multiple rooms of a building or in a large continuous area with multiple partitions.

Multiple detectors 10 may be included into system 2 so as to cover a larger area or reduce false triggering. Any of the elements of system 2 may also be incorporated into a wall box switch, into other types of occupancy sensors, or into various objects of the building interior.

It may be generally preferred that the occupancy signal is generated immediately upon detection of qualified RF transmission within a predetermined area and that the vacancy signal is generated after a certain delay. Such delay may be controlled, for example, by an internal timer provided with occupancy/vacancy signal generator 12.

Various elements of system 2 may be combined into a single circuit. For example, detector 10 and signal generator 12 may be implemented within a single device while preserving their main functions. Alternatively, at least some elements of system 2 may be implemented as separate devices and positioned in different locations. Such components may then be interconnected using wired or wireless links. For example, it may be advantageous for some applications to position detector 10 in a vicinity of lighting fixture 20 while incorporating load control circuit 14 into the wall box switch associated with such lighting fixture.

Figure 3:
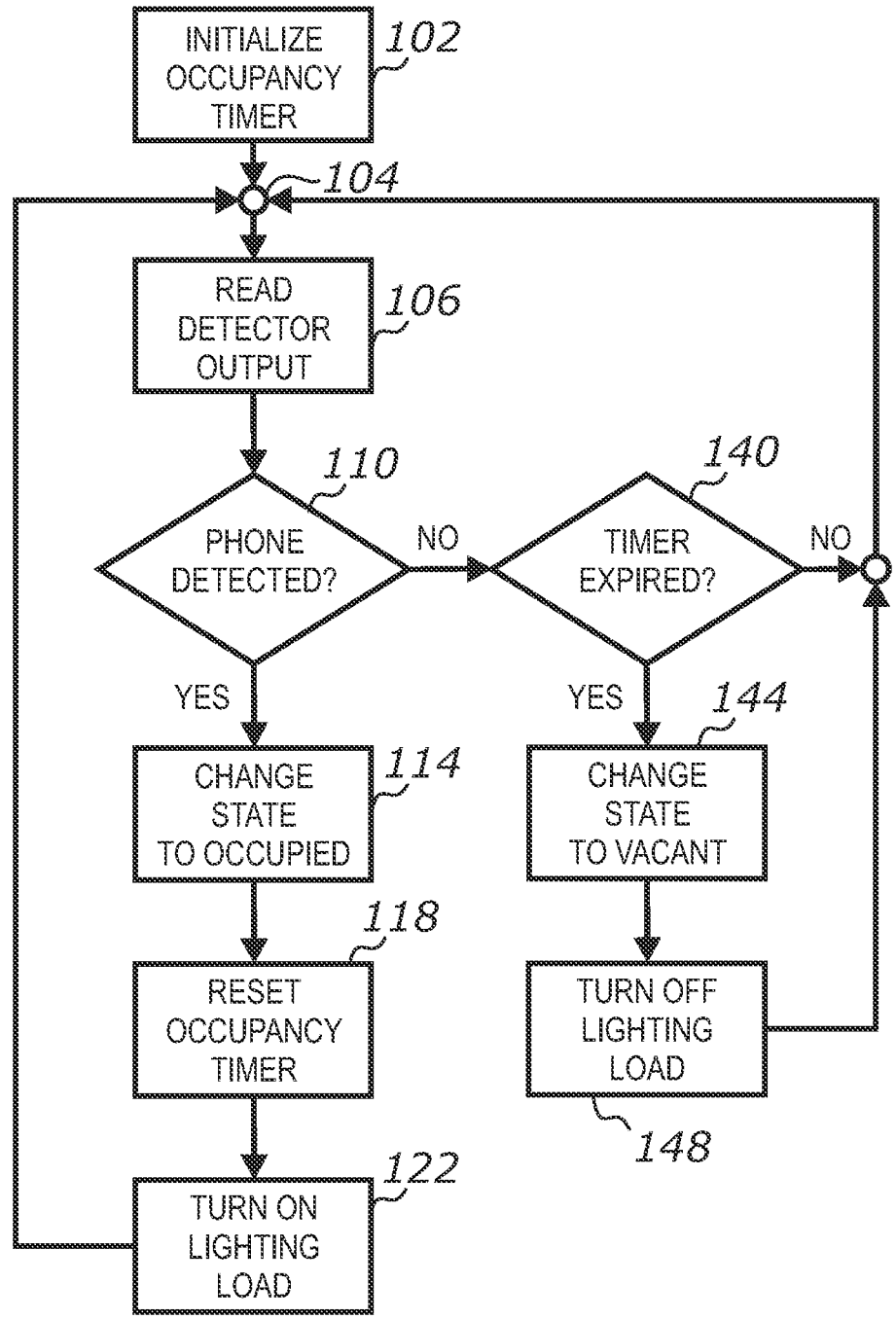
FIG. 3 is a schematic flowchart of a light control procedure executed by an occupancy sensing load control system, according to at least one embodiment of the present invention.

The flowchart of FIG. 3 illustrates a method of controlling the amount of power delivered from an electrical power source to a lighting load provided in a space and shows an exemplary load control process that can be implemented using the system 2 of FIG. 1, according to one embodiment of the present invention.

Referring to FIG. 3, an occupancy timer is first initialized upon powering on the occupancy sensing load control system 2 and a predetermined timeout period is set in step 102. By way of example and not limitation, the timeout period may be set to 10 minutes, 20 minutes, 30 minutes, or any other time intervals suited for the particular application. Moreover, the occupancy sensing load control system 2 may be provided with means for controlling the timeout interval by the user.

Referring further to FIG. 3, the output from detector 10 is read in step 106. Detector 10 detects a qualified RF signal emitted by a cell phone from within the designated space and provides such information in its output signal. Upon reading the "detected" signal from cell phone detector 10 in step 106 and determining the detection of the phone in step 110, the occupancy/vacancy signal generator 12 sets the occupancy/vacancy state to "occupied" in step 114 and the occupancy timer is reset in step 118. A control signal is then sent by to the lighting load to turn on the lights in step 122, after which the operation procedure of system 2 returns to point 104 and the process can repeat.

Referring yet further to FIG. 3, when no detection occurs, as determined in step 110, system 2 verifies whether or not the timer is expired in step 140. If the timer is not expired, that is the time elapsed on the timer is less the predetermined timeout, no signal is sent to the lighting control circuit and the system 2 proceeds back to point 104 for the next loop.

If the timer is expired at step 140 while no cell phone has been detected, the vacancy/occupancy state is set to "vacant" in step 144 and a control signal is sent to cease the delivery of power to the respective lighting fixture in step 148, thus turning lights off, after which the system 2 again proceeds back to point 104.

The process illustrated in FIG. 3 can be continued in a loop so that the system 2 can detect the occupancy and/or vacancy conditions and control lights accordingly in continuous automatic operation.

In one embodiment, the occupancy sensing load control system 2 may be configured to operate in only one of the occupancy sensing or the vacancy sensing modes. It may be useful, for example, when other types of occupancy sensing systems are employed to detect occupancy or vacancy and the RF-based detection provided by the system 2 of this invention is complementary to such other systems.

Figure 4:
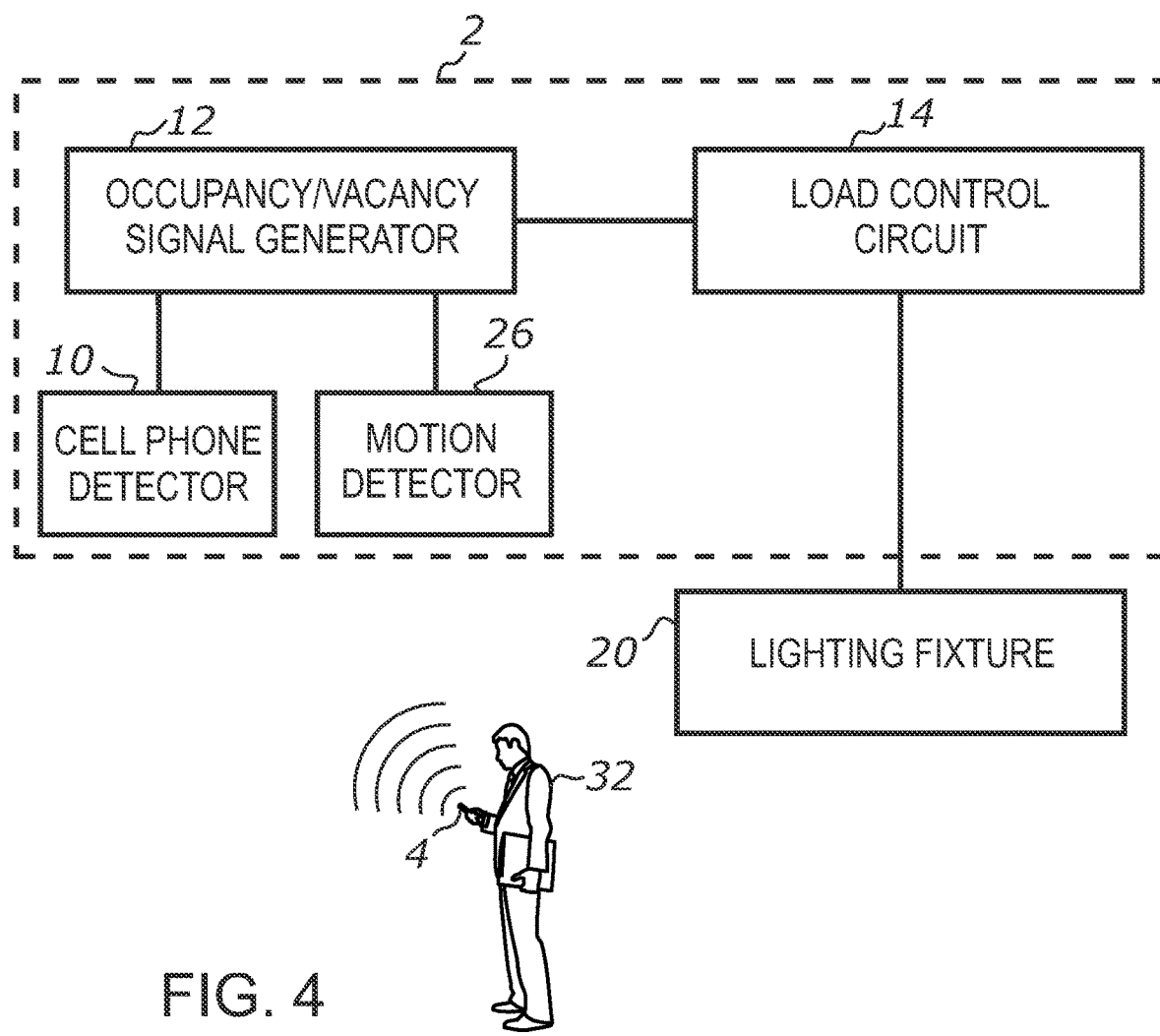
FIG. 4 is a schematic view of a system for controlling electric lighting using a mobile phone detector and further using a motion detector, according to at least one embodiment of the present invention.

In one embodiment, which is schematically illustrated in FIG. 4, system 2 may further include a motion detector 26. The occupancy/vacancy signal generator 12 may then be configured to receive input from both of the cell phone detector 10 and the motion detector 26 and use various algorithms and criteria to determine the occupancy or vacancy conditions in the room.

In a non-limiting example, the occupancy condition may be triggered when either one of detectors 10 and 26 detects a valid signal while the vacancy condition may be triggered when no signal is detected by both detectors after a predetermined timeout. In various embodiment of the present invention, signal generator 12 may employ separate process loops, process logic, criteria, timers and timeout intervals for detectors 10 and 26. Furthermore, system 2 may incorporate additional detectors of either type and may also include occupancy detectors of other types known in the art.

In one embodiment of the present invention, system 2 may further include means for producing an audible or visible alarm. For example, such alarm may be used to provide occupancy sensing feedback to building occupants or to perform system testing or tune up.

Figure 5:
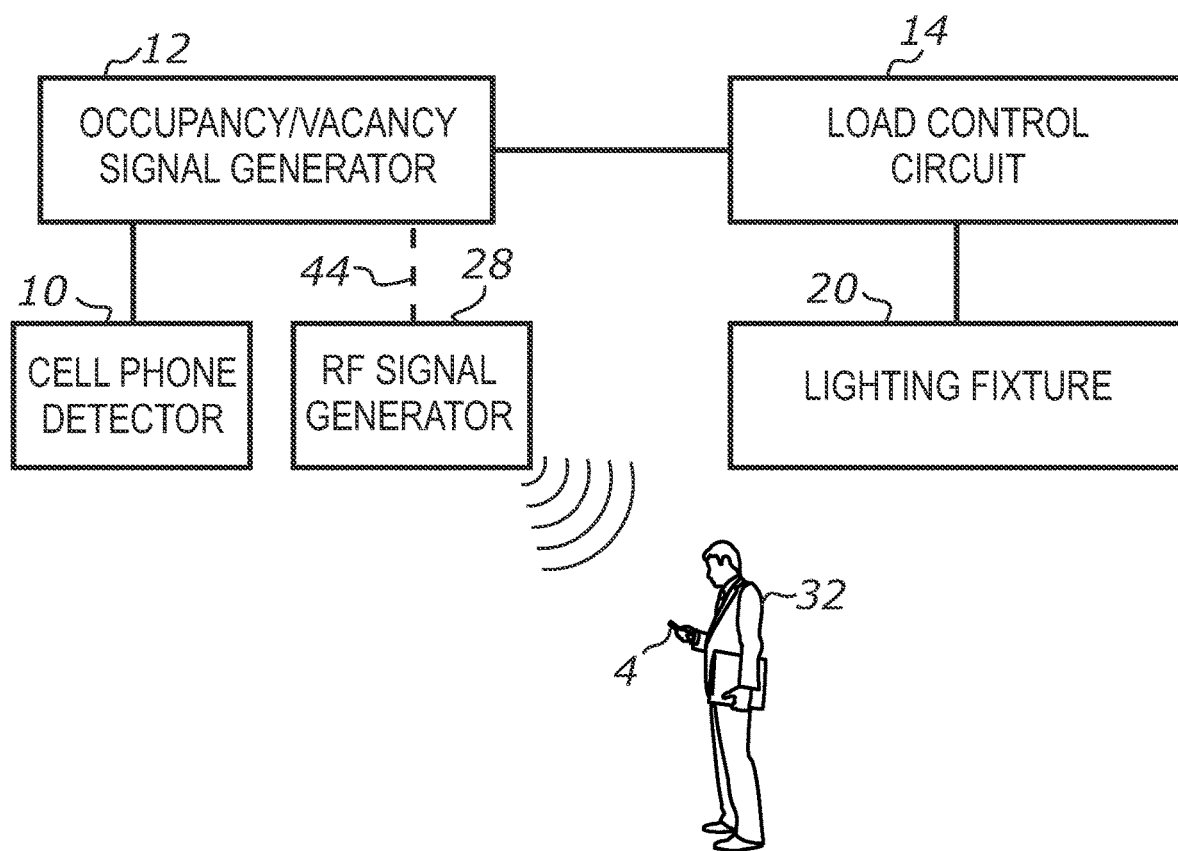
FIG. 5 is a schematic view of a system for controlling electric lighting using a mobile phone detection, further showing a radio-frequency signal generator, according to at least one embodiment of the present invention.

FIG. 5 shows an embodiment which further includes an active RF signal generator 28. RF signal generator 28 is configured to emit RF signals triggering an RF response from phone 4 so that such response can be detected by cell phone detector 10. Accordingly, system 2 can "poll" wireless devices that may be present in the room and determine the occupancy status at the time of polling.

The inclusion of RF signal generator 28 into system 2 may be useful, for example, for reducing the uncertainty of cell phone detection in the case when one or more cell phones are present in the monitored space and all of such phones are in a standby mode. Since timing of RF emissions by cell phones in standby is unpredictable, forceful triggering of phone responses may improve the detection rate and possible reduce the occurrence of false vacancy detection.

It will be appreciated by those skilled in the art that most cell phones continue receiving signals from base stations even when in a standby or idle state, as a matter of the cellular protocol operation. Conventionally, when a cell phone is in a stationary location at any point of time, it will receive a stronger signal from one base station which is closest to the phone location. As the signal from another base station becomes stronger than that from the previous station, the cell phone initiates a process of registering with the new base station. Such registration process involves sending one or more RF signals which can be detected by cell phone detector 10 thus triggering the occupancy condition.

In one embodiment, RF signal generator 28 is configured to generate and emit a pseudo base station signal corresponding to a base station signal for phone 4. An exemplary device and process of detecting telephone-activated devices in idle state using the generation and emission a pseudo base station signal corresponding to a base station signal for a cellular phone are described, for example, in U.S. patent Ser. No. 47/162,285.

RF signal generator 28 may be configured as a standalone device operating independently from the other elements of system 2. For example, it can be configured to periodically send response-triggering signals at predefined time intervals. Alternatively, RF signal generator 28 may be controlled by or be in a communication to the occupancy/vacancy signal generator 12 using a wired or wireless link 44. In such a case, the suitable times of RF transmissions by RF signal generator 28 may be determined by occupancy/vacancy signal generator 12.

It is noted that useful implementations of system 2 are not limited to detecting the occupancy or vacancy condition based on RF emission of cell phones and may be applied to the case when other types of personal RF-emitting communication devices may be used for such detection. Particularly, detector 10 may be configured to detect non-cellular mobile phones, satellite phones, smart phones, pagers, personal digital assistants (PDA), tablet computers, mobile personal computers, wireless medical devices, wireless network devices, wireless modems, personal area network devices, wireless cameras, wireless headsets, portable radios, cordless telephones, and global positioning systems (GPS).

Further embodiments and implementations of system 2 may include signal discrimination so as to detect only certain types of wireless communication devices while ignoring other types of RF-emitting devices. For example, ignoring signals that are typical for stationary devices such as wireless routers, radio-frequency identification devices (RFIDs) or systems, wireless phone base stations, and the like, may be advantageous for reducing false occupancy detections.

System 2 may also be provided with a memory and a memory processing unit (not shown) to store the RF signatures of individual devices detected by detector 10. Each newly detected signal may then be compared to the individual signatures stored in the memory and a predefined logic can be used to determine the occupancy status based on various criteria. The criteria used to determine the occupancy and/or vacancy conditions may also include analyzing the time of the day, the frequency of occupancy or vacancy triggering, the prevailing types of RF signals in a space and other factors.

For example, system 2 may be configured to ignore devices that operate 24 hours a day or the number of hours beyond a certain threshold significantly exceeding the expected work day, since such devices are much more likely to be stationary and not associated with the presence or absence of a building room occupant. The signal processing circuitry of system 2 may be implemented with learning algorithms so that such system can automatically identify and separate stationary devices from those associated with building occupants. Alternatively, or in addition to this, system 2 may be provided with user-operable controls or switches allowing the system to memorize devices that should be included in the detection and/or the devices that should be ignored.

For example, system 2 may be provided with a user-accessible button or switch which triggers the detection and storage of RF signatures of radio-emitting devices that should be ignored in its memory. Such button or switch may be activated at night when no people typically occupying the space during the day time are present. As the signals from the devices to be ignored are captured and stored, system 2 will prevent triggering an occupancy condition when new signals are detected from such devices.

In an alternative to button or switch activated detection of the RF devices to be ignored, system 2 may also be provided with a wireless signal receiver so that such detection can be triggered by the user remotely using a remote control unit or through wired or wireless network.

It is noted that the present invention is not limited to controlling electric lighting fixtures and may also be applied to the case of controlling other types of electric loads in response to the detected vacancy and/or occupancy conditions, such as, for example, heating units, air conditioning units, ventilation units, or security systems. In one embodiment, system 2 may be configured to arm an alarm system when a vacancy condition for a prolonged time period is detected.

Further details of operation of system 2 shown in the drawing figures as well as its possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An occupancy sensing lighting control system comprising:
   an electric lighting fixture configured to illuminate a surrounding area;
   a wireless communication unit associated with said electric lighting fixture and configured for operating at least in a radio frequency communication band of 50 MHz to 6 GHz;
   a signal-generating device configured for generating control signals detectable by a mobile cellular phone device which is located within the surrounding area and is not being in an active call mode;
   a signal detector configured to detect communication signals generated by said mobile cellular phone device;
   an occupancy condition generating device configured to determine occupancy condition in response to a detection of said communication signals; and
   a load control device configured to control a current supplied to said electric lighting fixture.

2. The occupancy sensing lighting control system as recited in claim 1, further comprising a memory unit configured to store identification information associated with said mobile cellular phone device, and further comprising a signal shielding cover which limits signal propagation directions.

3. The occupancy sensing lighting control system as recited in claim 1, comprising a signal shielding cover which limits signal propagation directions for said wireless communication unit.

4. The occupancy sensing lighting control system as recited in claim 1, wherein the wireless communication unit is configured to trigger audible or visual signal in response to a detection of the occupancy condition.

5. The occupancy sensing lighting control system as recited in claim 1, wherein at least one of said control signals is configured to trigger a response signal from said mobile cellular phone device.

6. The occupancy sensing lighting control system as recited in claim 1, wherein said signal detector has an adjustable sensibility.

7. The occupancy sensing lighting control system as recited in claim 1, wherein said signal detector is configured to detect cell phones located in a proximity of said electric lighting fixture.

8. The occupancy sensing lighting control system as recited in claim 1, comprising a memory processing unit configured for comparing identification information associated with said mobile cellular phone device with identification information from previously detected mobile cellular phone devices.

9. The occupancy sensing lighting control system as recited in claim 1, comprising a memory unit configured to store identification information associated with said mobile cellular phone device, and a memory processing unit configured for comparing said identification information associated with said mobile cellular phone device with identification information from other devices stored in said memory unit, wherein the occupancy condition generating device is configured to ignore a detection of communication signals from at least some of said other devices.

10. The occupancy sensing lighting control system as recited in claim 1, further comprising a motion detector, wherein the occupancy condition generating device is configured to determine occupancy condition based on an input from both said signal detector and said motion detector.

11. The occupancy sensing lighting control system as recited in claim 1, wherein said signal detector comprises two or more signal sensing devices distributed over the surrounding area and is configured to compare signals received from said two or more signal sensing devices.

12. An occupancy sensing lighting fixture comprising:
    a light source configured to illuminate a surrounding area;
    a wireless communication unit configured for operating at least in a radio frequency communication band of 50 MHz to 6 GHz and comprising a signal-generating device configured for generating control signals detectable by a mobile cellular phone device located within the surrounding area and not being in an active call mode;
    a signal detector configured to detect communication signals generated by said mobile cellular phone device;
    an occupancy condition generating device configured to determine occupancy condition in response to a detection of said communication signals; and
    a load control device connected between an electrical power source and said light source and configured to control a current supplied to said light source.

13. The occupancy sensing lighting fixture as recited in claim 12, comprising a signal shielding cover which limits signal propagation directions.

14. The occupancy sensing lighting fixture as recited in claim 12, wherein at least one of said control signals is configured to trigger a response signal from said mobile cellular phone device.

15. The occupancy sensing lighting fixture as recited in claim 12, wherein said load control device is configured to control a current supplied to said light source in response to determining said occupancy condition.

16. The occupancy sensing lighting fixture as recited in claim 12, comprising a device configured to produce audible or visual signals.

17. The occupancy sensing lighting fixture as recited in claim 12, wherein the signal detector is configured to simultaneously monitor more than one radio frequency band.

18. A method of communicating with building occupants, comprising the steps of:
- providing an electric lighting fixture configured to illuminate a surrounding area;
- sending directional control signals from said electric lighting fixture towards said surrounding area;
- detecting a presence of a mobile cellular phone device being not in an active call mode within said surrounding area;
- changing the amount of electric power delivered to said electric lighting fixture; and
- triggering an audible or visual signal in response to a detection of the presence of said mobile cellular phone device.

19. The method of communicating with building occupants as recited in claim 18, further comprising the step of receiving and storing identification information associated with said mobile cellular phone device.

20. The method of communicating with building occupants as recited in claim 18, further comprising the step of detecting a presence of a user of said mobile cellular phone device within said surrounding area using a motion detector.

* * * * *